(12) United States Patent
Neumann et al.

(10) Patent No.: US 7,755,863 B2
(45) Date of Patent: Jul. 13, 2010

(54) ADJACENT TRACK READERS

(75) Inventors: Lawrence G. Neumann, Lancaster, MA (US); William A. Buchan, Corona Del Mar, CA (US)

(73) Assignee: Quantum Corporation, San Jose, CA (US)

( * ) Notice: Subject to any disclaimer, the term of this patent is extended or adjusted under 35 U.S.C. 154(b) by 1093 days.

(21) Appl. No.: 11/376,588

(22) Filed: Mar. 14, 2006

(65) Prior Publication Data
US 2007/0217078 A1    Sep. 20, 2007

(51) Int. Cl.
*G11B 5/58*    (2006.01)
(52) U.S. Cl. .................................................. 360/77.01
(58) Field of Classification Search ........................ None
See application file for complete search history.

(56) References Cited

U.S. PATENT DOCUMENTS

| | | | | |
|---|---|---|---|---|
| 4,636,898 A | * | 1/1987 | Suzuki et al. ............... | 360/122 |
| 5,237,476 A | * | 8/1993 | Bischoff et al. .......... | 360/123.1 |
| 5,321,561 A | * | 6/1994 | Barr et al. ..................... | 360/48 |
| 5,760,995 A | | 6/1998 | Heller et al. | |
| 6,040,964 A | * | 3/2000 | Saliba ........................ | 360/121 |
| 7,393,066 B2 | * | 7/2008 | Dugas et al. ............. | 360/77.14 |
| 7,428,120 B2 | * | 9/2008 | Berman et al. ........... | 360/77.01 |
| 7,474,488 B2 | * | 1/2009 | Czarnecki et al. ............ | 360/63 |
| 7,649,707 B2 | * | 1/2010 | Saliba ........................ | 360/75 |
| 2007/0285838 A1 | * | 12/2007 | Hennecken et al. ......... | 360/129 |

OTHER PUBLICATIONS

Baker, S. et al., (2005) "Multi track recording in helical scan tape system," Presented at the THIC Meeting at the Sony Auditorium, San Jose, CA, Apr. 19-20, 2005.

* cited by examiner

*Primary Examiner*—Mark Blouin
(74) *Attorney, Agent, or Firm*—Baker Botts L.L.P.

(57) ABSTRACT

Aspects include readers for magnetic storage media. Each reader is operable to read multiple tracks from the storage media simultaneously by using a plurality of active regions, each active region for reading a different track. The active regions may be disposed in rows of columns, and between rows, each active region in a row may be separated from other active regions in that row to prevent interference between those active regions. Active regions of different rows may be offset from each other such that no active region overlaps with another active region over the same data track. Active regions may share shielding and/or sense current conductors. Active regions may comprise AMR, CIP GMR, CPP GMR, including spin valve and tunneling varieties of flux sensors. Multiple active regions in a row may be defined from a single MR element by spaced apart voltage tabs. Readers may be integrally fabricated in layers.

36 Claims, 7 Drawing Sheets

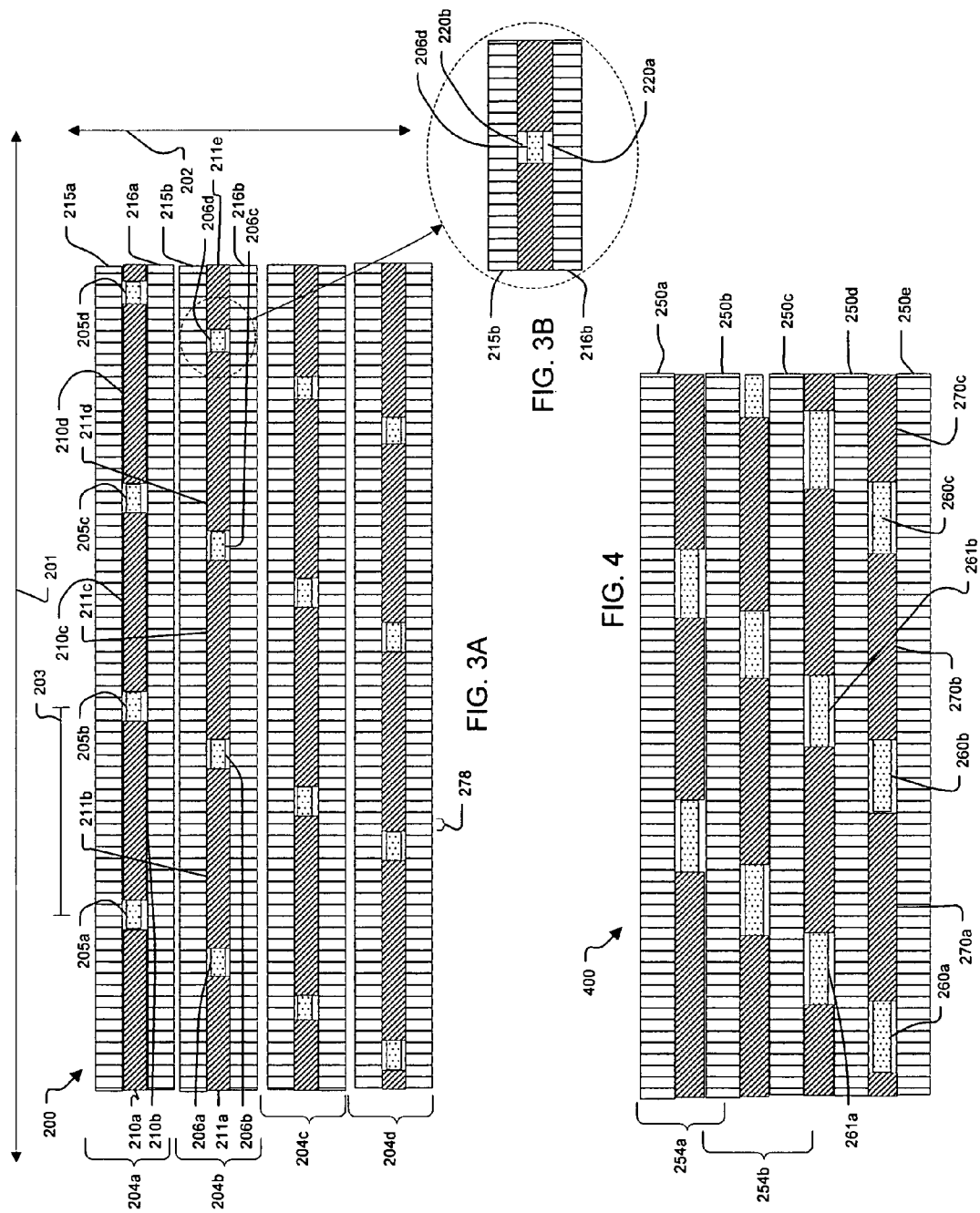

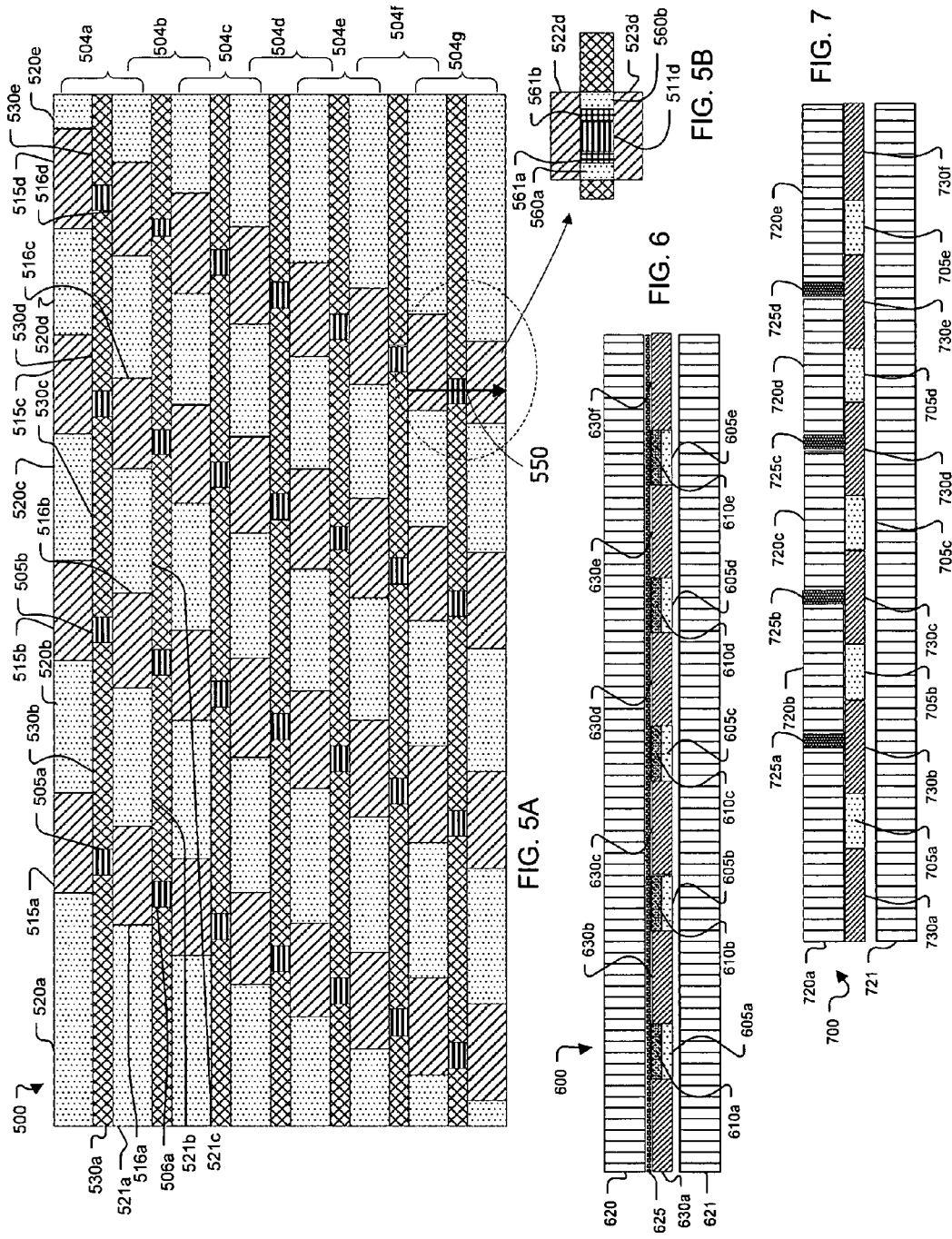

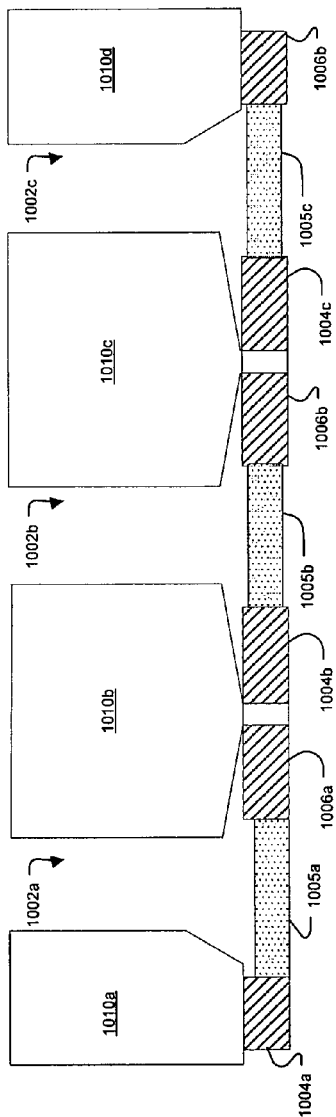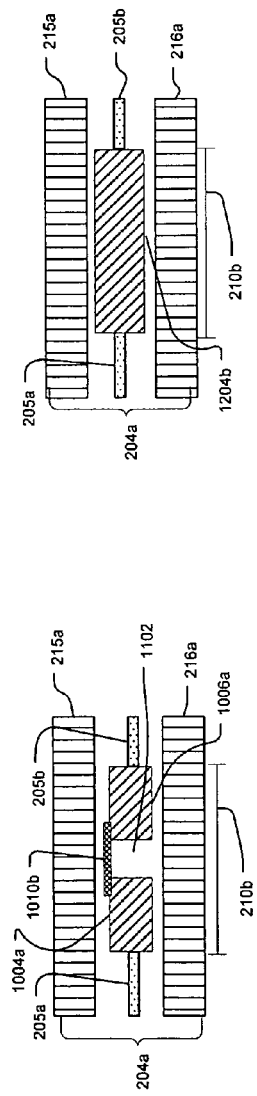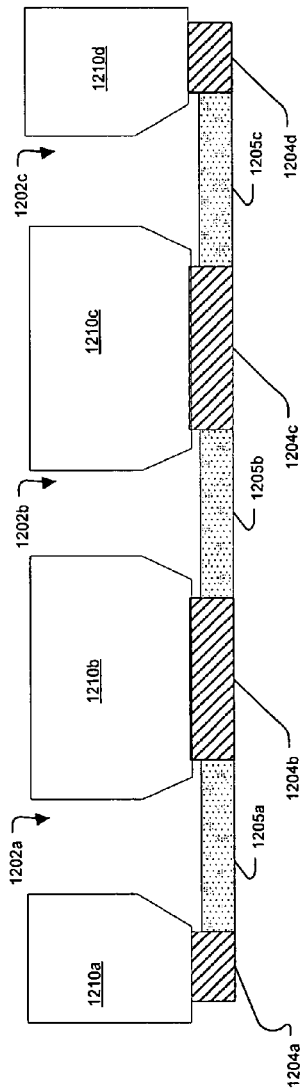

US 7,755,863 B2

ADJACENT TRACK READERS

BACKGROUND

1. Field

The present invention relates generally to readers for magnetic storage media, and more particularly to readers for magnetic tape data storage media.

2. Description of Related Art

In one related art field, tape with magnetic particles impressed thereon is used as a data storage medium. Tape may be nominally about one half inch wide. Tape typically has a base layer formed from polymers that are flexible and subject to dimensional distortion and instability, including changes in width of the tape. Tracks of data may be recorded on the media (e.g., approximately longitudinally along the length of the media or portions of the length of the media). In additional to some amount of room for the magnetic domains used for recording each data bit along each track, tape includes separation between magnetic domains of adjacent tracks to prevent interference between tracks. Distance between tracks, including the domains and the separation space, is called track pitch. Track pitch may be less than 10 microns. Tracks may be spaced across a good portion of the entire width of the tape. Thus, there are usually a number of tracks on a given tape and considerable non-data bearing space between simultaneously-written tracks on the tape. Later passes of the tape with adjusted head position will use those regions for additional data tracks.

To enhance data throughput, it is desirable to have readers for magnetic tape that read a plurality of tracks simultaneously. One option for reading a plurality of tracks would be to build readers having multiple individually formed read elements spread out in a row across a portion of the width of the tape (see FIGS. 1A-B). Read elements of such a multiple track reader would interfere with each other if placed too closely, and therefore would be separated across some portion of the width of the tape to minimize this interference. This spacing results in readers that read separated tracks, which increases the sensitivity to the negative effects of dimensional distortion, including difficulty in tracking all the tracks (keeping each read element over its intended track) as the tape moves past the reader. Therefore, a solution to minimize negative effects of dimensional distortion while maintaining data throughput is desirable.

SUMMARY

Presently described aspects provide readers for reading from magnetic storage media. Each reader is operable to read multiple tracks from the storage media simultaneously by using a plurality of magnetoresistive active regions, each active region for reading a different track. The active regions may be generally disposed in rows of active regions separated by inactive regions. Active regions of different rows are offset from each other so that active regions of different rows generally read different ones of adjacent tracks.

According to a first example, a reader for magnetic storage media comprises a first row of a plurality of active regions. Each active region of the first row is separated from nearest active regions in the first row by approximately at least a width of an active region. The reader further comprises a second row of a plurality of active regions; each active region of the second row is separated from nearest active regions in the second row by approximately at least the width of the active region. Each active region in the second row is columnwise offset from active regions in the first row by at least approximately the width of the active region.

A reader according to the first example may further comprise a third row of a plurality of active regions. Each active region of the third row may be separated from nearest active regions in the third row by approximately at least twice the width of the active region. In readers of such an example, active region in other rows may also separated from nearest active regions in respective rows by about twice the width of the active region. Active regions in the first, second and third rows may also be offset from each other by at least approximately the width of the active region.

According to a second example, a reader for reading from a magnetic storage medium includes a face portion for opposing a surface of the magnetic storage medium. The face comprises a plurality of active regions disposed into a plurality of adjacent rows. Each row has multiple active regions, with inactive regions separating active regions in each row. Each active region of a row is generally column-wise offset from active regions of adjacent rows. Each inactive region has a width at least approximately as great as a width of the active region multiplied by the number of rows of the plurality.

According to another example, a magnetic tape storage tape drive, comprises a tape path for moving a tape through the drive. The tape has a plurality of data tracks disposed, at a track pitch, across at least a portion of a width of the tape. The tape drive further comprises a tape read head having a face portion; the tape read head being disposed for sensing magnetic flux from the tape. The face portion of the tape read head comprises a plurality of active regions a really dispersed on the face portion of the tape read head such that no active region is operable to sense data from the same data track as another active region.

In a further example, a reader for magnetic storage media comprises a plurality of rows of integrally formed magnetoresistive read elements. Each read element of each row is approximately spaced apart from adjacent read elements of that row by at least a width of the active region multiplied by one less than the number of rows in the plurality. Read elements of all rows of the plurality are column-wise offset from each other by about a width of an active region of the read elements.

BRIEF DESCRIPTION OF THE DRAWINGS

For a fuller understanding of aspects and examples disclosed herein, reference is made to the accompanying drawings in the following description.

FIG. 3A illustrates an end face view of a portion of an exemplary multi-layered, multi-track reader;

FIG. 3B illustrates gaps formed proximate an active region of the multi-track reader portion of FIG. 3A;

FIG. 4 illustrates a cross-section of a portion of an exemplary multi-layered, multi-track reader that implements shared magnetic shields between layers of the reader portion;

FIGS. 5A-B illustrates cross-sections of portions of an exemplary multi-layered, multi-track reader that implements shared magnetic shields between layers;

FIG. 6 illustrates a row (a single layer) for forming portions of multi-layered, multi-track readers implementing separate current sources and a shared current sink between active regions of the row;

FIG. 7 illustrates an alternative row (a single layer) for forming portions of multi-layered, multi-track readers implementing separate current sources and a shared current sink between active regions of the row;

FIG. 10 illustrates a top view of another design for exemplary read elements that may be used in forming active regions of exemplary reader portions of FIGS. 3-5;

FIG. 11 illustrates a cross-section of an active region of the reader portion of FIG. 3A using read elements of FIG. 10;

FIG. 12 illustrates a top view of another design for exemplary read elements that may be used in forming active regions of exemplary reader portions of FIGS. 3A-5A;

FIG. 13 illustrates a cross-section of an active region of the reader portion of FIG. 3A using read elements of FIG. 12;

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed in a variety of data storage systems, including rotating disk storage systems. Various sensor technologies and materials may be used in place of or in additional to those described. Various methods for manufacturing may be employed. Exemplary dimensions and relative relationships among structures may be modified. Generally, for ease of illustration, illustrations herein are not to scale. In sum, the exemplary system configurations, components, exemplary tolerances, design criteria, and the like provided are for illustrating various inventive aspects and are not intended to limit configurations, components, tolerances, designs in which these aspects may be employed.

Figure 1A:
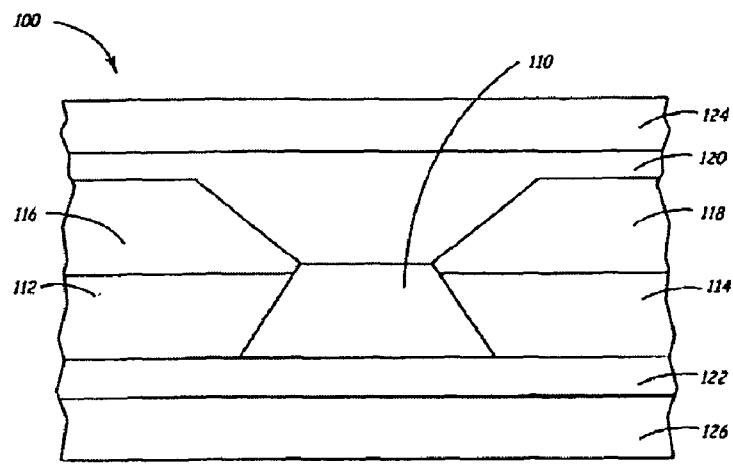
FIGS. 1A-B respectively illustrate CIP and CPP single track reader structures.
Figure 1B:
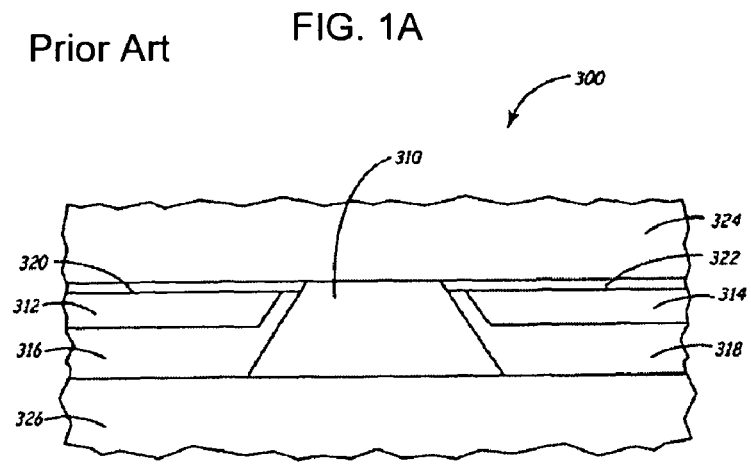
Figure 2:
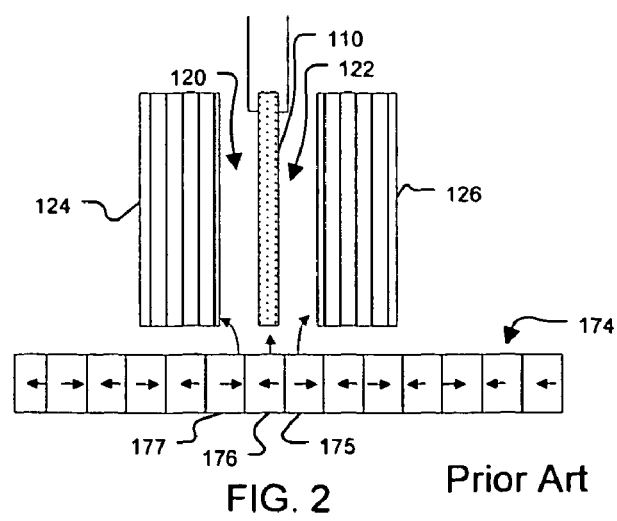
FIG. 2 schematically illustrates a relative disposition of elements of a single track reader and a data track of a storage medium.

Before describing in more detail examples of certain inventive aspects and embodiments, aspects of Current in Plane (CIP) and Current Perpendicular to the Plane (CPP) transducing heads are briefly described in FIGS. 1A-B and an arrangement of recording media to portions of a transducing head is illustrated in FIG. 2 to provide context for later discussions.

Example Cip Transducing Head:

FIG. 1A is a cross-sectional illustration of an example of a current-in-plane (CIP) transducing head 100. Transducing head 100 comprises magnetoresistive (MR) sensor 110, permanent magnet (PM) bias elements 112 and 114, contacts 116 and 118, gap layers 120 and 122, and shields 124 and 126.

MR sensor 110 is a multilayer device operable to sense magnetic flux from a magnetic media. MR sensor 110 may be any one of a plurality of MR-type sensors, including, but not limited to, Anisotropic MR (AMR), and Gigantic MR (GMR). One layer (not separately illustrated) of MR sensor 110 is a sensing layer, such as a free layer of a GMR spin valve sensor that is in this example longitudinally biased by PM bias elements 112 and 114.

PM bias elements 112 and 114 abut opposite sides of MR sensor 110. PM bias elements 112 and 114 are often included to stabilize MR sensor 110 and resist formation of edge domains that may cause noise that interferes with recovery of data from detected signals. PM bias elements 112 and 114 may be formed of a hard magnetic material, such as, but not limited, to CoCrPt, CoCr, CoCrTa, CoCrTaPt, CoPt, or CoNiCr. The MR sensor 110 may generally be many times smaller in length than the PM bias elements 112 and 114.

Contact 116 is formed on PM bias element 112. Similarly, contact 118 is formed on PM bias element 114. Contacts 116 and 118 abut opposite sides of MR sensor 110. In this example, contacts 116 and 118 function to provide a sense current flow through MR sensor 110 in a direction substantially parallel to planes of layers (not shown) of MR sensor 110. As is generally known in the industry, the sense current is passed through MR sensor 110 to detect changes in the resistivity of MR sensor 110, caused by magnetic flux changes indicative of the data stored on the magnetic medium being read. Contacts 116 and 118 are typically formed of conductive materials, such as, but not limited to, tantalum, rhodium, titanium, tungsten, chromium, copper, gold or silver.

Gap layer 120 is formed adjacent MR sensor 110 and contacts 116 and 118. Gap layer 122 is formed adjacent MR sensor 110 and adjacent PM bias elements 112 and 114. Gap layers 120 and 122 abut opposite sides of MR sensor 110. Gap layers 120 and 122 function to magnetically insulate MR sensor 110 from shields 124 and 126. Gap layers 120 and 122 are formed of nonmagnetic material.

Shield 124 is formed on gap layer 120 opposite MR sensor 110 and contacts 116 and 118. Shield 126 is formed on gap layer 122 opposite MR sensor 110 and PM bias elements 112 and 114. MR sensor 110 reads information stored directly beneath it on a specific track of the magnetic medium because shields 124 and 126 function to absorb stray magnetic fields emanating from other magnetic domains of the track (transitions between bits).

Example Cpp Transducing Head:

FIG. 1B is a cross-sectional illustration of an example CPP transducing head 300. For ease of identification, elements here similar to those in FIG. 1A are like-numbered in the last two digits. By example, CIP transducing head 100 and CPP transducing head 300. Transducing head 300 comprises any one of a plurality of MR-type sensors, including, but not limited to, a Gigantic MR (GMR) sensor or a tunneling giant magnetoresistive (TGMR) sensor 310, PM bias elements 312 and 314, gap layers 316, 318, 320, and 322, and shields 324 and 326. CPP transducing head 300 differs from CIP transducing head 100 in that the sense current to MR sensor 310 is provided in a direction substantially perpendicular to the planes of layers (not shown) of MR sensor 310, rather than in a direction substantially parallel.

MR sensor 310 is a multilayer device operable to sense magnetic flux from a magnetic media. At least one layer of MR sensor 310 is a sensing layer that may be longitudinally biased, and as illustrated PM bias elements 312 and 314 are formed on opposite sides of MR sensor 310 for biasing that sensing layer. PM bias elements 312 and 314 may be recessed from MR sensor 310.

Gap layer 316 is formed adjacent MR sensor 310 between PM bias element 312 and shield 326. Gap layer 318 is formed adjacent MR sensor 310 between PM bias element 314 and shield 326. Gap layers 316 and 318 abut opposite sides of MR sensor 310.

Gap layer 320 is formed adjacent MR sensor 310 between PM bias element 312 and shield 324. Gap layer 322 is formed adjacent MR sensor 310 between PM bias element 314 and shield 324. Gap layers 320 and 322 abut opposite sides of MR sensor 310.

Gap layers 316, 318, 320, and 322 function to magnetically insulate MR sensor 310 from shields 324 and 326. Gap layers 316, 318, 320, and 322 may also function to minimize shunting of sense current from MR sensor 310 to PM bias elements 312 and 314. Gap layers 316, 318, 320, and 322 are generally formed of nonmagnetic material.

Shield 324 is formed adjacent MR sensor 310 and gap layers 320 and 322. Shield 326 is formed adjacent MR sensor 310 and gap layers 316 and 318. Shields 324 and 326 are formed on opposite sides of MR sensor 310. MR sensor 310 reads information stored beneath it on a specific track or channel of a magnetic medium because shields 324 and 326 function to absorb stray magnetic fields emanating from nearby magnetic domains of the track being read. In addition, shields 324 and 326 may function to provide a sense current to MR sensor 310 in a direction substantially perpendicular to planes of layers (not shown) of MR sensor 310. As is known in the art, the sense current is passed through MR sensor 310 to detect changes in the resistivity of MR sensor induced by magnetic flux changes indicative of data stored on the magnetic medium being read. Shields 324 and 326 may be composed of a soft magnetic material, such as, but not limited to, an NiFe alloy.

Each of the above tranducing heads, also know as read heads, are adapted for reading a single track of data from, for example, a magnetic tape moving through a tape drive. In some configurations, these read heads may be connected by a structure in a row in order to read multiple tracks simultaneously. However, these configurations provide spacing between read heads that may span a large number of data tracks, resulting in the dimensional instability problems discussed above. The following explanation provides a variety of examples concerning structures adapted for reading a plurality of tracks of data from storage media, such as magnetic tapes, where those tracks are close to adjacent, or adjacent to one another on the media.

To further provide context, FIG. 2 schematically illustrates a side view of a relative disposition of portions of a CIP reader, including an MR sensor, such as MR sensor 110 in FIG. 1A, with respect to a track 174 of a magnetic storage medium. The reader includes gap layers 120 and 122 disposed on either side of MR sensor 110, and shields 124 and 126 disposed distal MR sensor 110 on against gap layers 120 and 122. As illustrated, track includes a plurality of magnetic domains (e.g., magnetic domains 175-177). The storage medium is made to move under the reader so that each of the plurality of magnetic domains is at some point under the reader. As each of the magnetic domains comes closer to being under the reader, its magnetic flux has an increasingly large affect on the MR sensor. To help isolate MR sensor to be affected only by a desired magnetic domain, shields 124 and 126 absorb fields from those nearby domains.

FIG. 3A illustrates an exemplary cross-section of a reader portion 200 for reading closely spaced tracks on a magnetic storage medium, such as a magnetic tape. This illustrated cross-section is from proximate an end of the reader portion that would be disposed to face a data bearing surface of the storage medium after assembly into a tape drive. For this illustration, the cross-section is generally rectangular and may be described as having an X dimension 201 that would be disposed generally perpendicular to a length of the tape and a Y dimension 202 disposed generally parallel to a length of the tape.

Active regions 205a-d, generally row-wise disposed along X dimension 201, may each aligned with an expected relative position of a data track on the storage medium. Exemplary track pitch indication 203 illustrates an expected relative positioning of data tracks of the data bearing surface of the storage medium. Track pitch indication 203 would generally be a multiple of the actual track pitch, as further discussed with regard to FIG. 8. As the storage medium moves past active regions 205a-d, magnetic domains previously written with data are moved under each of active regions 205a-d (analogously to the single read element illustrated in FIG. 2 above).

Reader portion 200 includes top shield 215A and bottom shield 216a. Between top shield 215A and bottom shield 216a are disposed inactive regions respectively numbered 210a-d. Each active region 205a-d is bracketed by two inactive regions. For example active region 205A is bracketed by inactive regions 210a and 210b.

Inactive regions (e.g., 210a-d) may comprise a variety of materials and arrangement of materials, depending at least on what type of active region is chosen (e.g., CIP, or types of CPP structures), as will be further discussed with regard to examples of FIGS. 7-15. Generally, for current in plane reader designs, inactive regions (e.g., inactive regions 210a-d) may comprise pairs of current leads and permanent magnetic materials on both sides of respective active regions (e.g., active region 205A with respect to inactive regions 210a and 210b).

Active regions may be formed according to a variety of MagnetoResistive (MR) principles, such as Anisotropic MR (AMR), Gigantic MR (GMR), including tunnel junction and spin valve varieties of GMR active regions.

In brief summary, row 204a (may also be called a layer) of reader portion 200 includes top shield 215A, and bottom shield 216a. A plurality of active regions 205a-d spaced apart at approximately a multiple of a track pitch for a storage medium intended to be read are disposed between top shield 215A and bottom shield 216a. Inactive regions 210a-d separate active regions from each other and are also disposed between top shield 215A and bottom shield 216a. Reader portion 200 comprises at least two rows, e.g., row 204a and row 204b.

Active regions 206a-d are generally row-wise disposed along X dimension 201 and aligned with expected relative positions of respective data tracks on the storage medium. In addition, active regions 206a-d of row 204b may be further disposed to be offset in X dimension 201 from active regions 205a-d of row 204a and active regions of other rows of reader portion 200. The offset may be selected such that during nominal reading operation, each active region reads a separate part of the recorded medium. In other words, the offset may be selected such that when traversing reader portion 200 in Y dimension 201, each lateral section of magnetic medium nominally encounters one active region. In some aspects, the active regions can be narrower than the tracks and would preferably laterally adjacent to each other so that the array of active regions covers the entire packet of recorded tape. In such aspects, some active regions can be reading parts of two adjacent tracks while other active regions would be entirely on a single data track. In such cases, signals generated by active regions reading parts of two adjacent may be ignored in preference for other active regions that are separately positioned only over a single track. Alternatively, such signals may be subject to further signal processing for extracting information for each separate track from such blended signals.

In exemplary reader portion 200, active regions 206a-d are each offset by about at least a width of an active region from respective nearest active regions 205a-d. Additionally, a guard distance may also be included for further isolating an active region of one row from active regions of other rows. Depending on how many rows are included in reader portion 200, the offsetting of active regions of one row from active regions of other rows may be selected so that active regions from nearest rows are relatively offset by at least about two widths of active regions. For example, in reader portions of 4 or more rows, each active region may be spaced such that no active regions of adjacent rows are column-wise closer than active regions of non-adjacent rows. Active regions may therefore be offset from other active regions in nearest rows by about at least two active region widths. The distance between active regions may also include a guard band distance, for example guard distance 278. Guard distance 278 may be smaller than half the width of the active region, and may be between 0.1 microns and 0.5 microns wide. Including some additional space may help prevent interference between active regions and provide some tolerance for misalignment of active regions during formation or assembly of the reader portion. In other aspects, the active regions of a single row could slightly overlap active regions of other rows, thereby providing a reader for sensing the entire width of a magnetic medium with at least one MR sensor.

Row 204b further includes a top shield 215B and a bottom shield 216b between which are disposed active regions 206a-d and inactive regions 211a-d, which are interleaved with active regions 206a-d to separate active regions from each other.

Exemplary reader portion 200 includes four rows: rows 204a-d. Each of rows 204a-d includes respective top and bottom shields, and interleaved active and inactive regions, as described above and illustrated (some without separate numbering) in FIG. 3A. Active regions in each of rows 204a-d are offset from active regions in other rows in accordance with aspects described above.

In some designs, reader portion 200 may include active regions in a plurality of rows that are relatively disposed to read adjacent tracks. For example, a reader portion may comprise 3 rows of 4 active regions each. Each of the 4 active regions in each row may be disposed to read every third data track, starting offset from each other. For example, active regions of row 1 may read data tracks 1, 4, 8 and 12, active regions of row 2 may read data tracks 2, 5, 7, and 10, and active regions of row 3 may read data tracks 3, 6, 9, and 11. Other sets of data tracks may be read by relatively moving the reader portion and the tape, for example such that the first active region of the first row starts at track 13.

Further description regarding relative arrangements and compositions of active regions and inactive regions of each row 204a-d is provided with respect to FIGS. 8-15.

FIG. 3B illustrates that gaps are disposed between active regions (in FIG. 3B exemplary active region 206d) and respective top and bottom shields (in FIG. 3B, top shield 215B and bottom shield 216b and gaps 220b and 220a are illustrated by example). Gaps 220b and 220a may comprise a variety of materials and may have a variety of shapes depending on processes for forming reader portion 200. In some CIP designs, gaps 220b and 220a are for insulating active regions of reader portion 200 from shield portions, and thus would generally be formed from non-magnetic material.

Now turning to FIG. 4, an alternative exemplary reader portion 400 for reading closely spaced data tracks on a storage medium is illustrated. Reader portion 400 illustrates a shared shield design where interleaved active regions and inactive regions are disposed between shields, where one of those shields also serves to shield active regions of another row. By example, row 254a and row 254b share shield 250b. Remaining shared shields 250c-d are also illustrated; shield 250e may be considered shared since the illustration is of a portion of a reader, and the entire reader may comprise another row sharing shield 250e. Because reader portion 400 has fewer shields for the same number of rows compared with reader portion 200, reader portion 400 may be constructed to be smaller in Y dimension 202 than reader portion 200, with other characteristics held unchanged. However, reader portion 400 may be more sensitive to noise between active regions than reader portion 200. Active regions 260a-d and inactive regions 270a-d are also illustrated in FIG. 4 and may be substantially similar to those described with respect to FIG. 3. FIG. 4 illustrates an aspect where active regions between rows may slightly overlap such that a contiguous portion of a storage medium may be read by the active regions. For example, active region 260a columnwise overlaps with active region 261a.

FIG. 5A illustrates a reader portion 500 comprising a plurality of rows (rows 504a-d illustrated). Each row includes a plurality of electrically isolated shields (e.g., shields 515a-d of row 504a) arranged in a width wise direction (like X dimension 201). The shields are separated from each other by non-magnetic regions (e.g., non-magnetic regions 520a-e of row 504a). Each row also includes a plurality of active regions (e.g., active regions 505a-505d of row 504a) separated from each other by non-magnetic regions 530a-e. Each row shares a plurality of shields and non-magnetic regions with adjacent rows (e.g., row 504a and row 504b share shields 516a-d and inactive regions 521a-e In an exemplary design, a shield shared between active regions in adjacent rows may serve as a tapped current lead for each of those active regions. By example, shield 516a may serve as a tapped current lead for active regions 505A and 506a. Sense current 550 may traverse between shields (e.g, shield 515A and shield 516a for active region 505A). In such examples, a CPP active region design may be used.

FIG. 5B illustrates an example aspect that may be employed in the reader portion 500. FIG. 5B illustrates that active region 511d is bracketed by conductors 561a and 561b which serve to either source or sink current from/to active region 511d. Bracketing conductors 561a and 561b are biasing elements 560a and 560b. In aspects according to FIG. 5B, shields 522d and 523d may be at least as wide as the summation of the widths of the active region 511d plus any of the conductors 561a and 561b and biasing elements 560a and 560b, if present. In cases where biasing elements source and/or sink current, the shields may be at least as wide as the width of the active region plus the width of the biasing elements.

FIG. 6 illustrates a row 600 of another example reader portion. Row 600 may be repeated analogously to how rows 504a-g in FIG. 5 and rows 204a-d in FIG. 3A were repeated. Row 600 includes a top shield 620 and a bottom shield 621. Top shield 620 is electrically insulated from non-magnetic regions 630a-f and from conducting regions 610a-e by an insulator 625. Conducting regions 610a-e conduct current to respective active regions 605a-e, which then conduct current to shared lower shield 621 according to their respective resistances as determined, for example, by the magnetoresistive effect. Shared lower shield 621 sinks current from active regions 605*a-e*. Shared lower shield 621 may also sink current from active regions disposed below shield 621 (i.e., row 600 may be repeated symmetrically around shield 621) with appropriate offsets in keeping with each active region sensing bits from only 1 track.

FIG. 7 illustrates a cross-section view of another row 700 for forming a reader portion for reading closely spaced tracks. Similar to FIG. 6, FIG. 7 includes a bottom shield 721 sinking current from active regions 705*a-e*. Active regions 705*a-e* are interleaved between non-magnetic regions 730*a-f*. Top shield sections 720*a-e* are each disposed in electrical contact with respective active regions 705*a-e*. Each top shield section 720*a-e* is electrically isolated from other top shield sections by insulators 725*a-d*. Row 700 may be used repeatedly with offsets for active regions as discussed with respect to previous figures.

The above reader portions and rows that may be used to form reader portions are examples of types of reader structures that may be formed according to aspects presented herein to read closely spaced tracks on magnetic storage media. Further details regarding construction and composition of read portions according to the above figures is described with relation to FIGS. 8-15.

Figure 8:
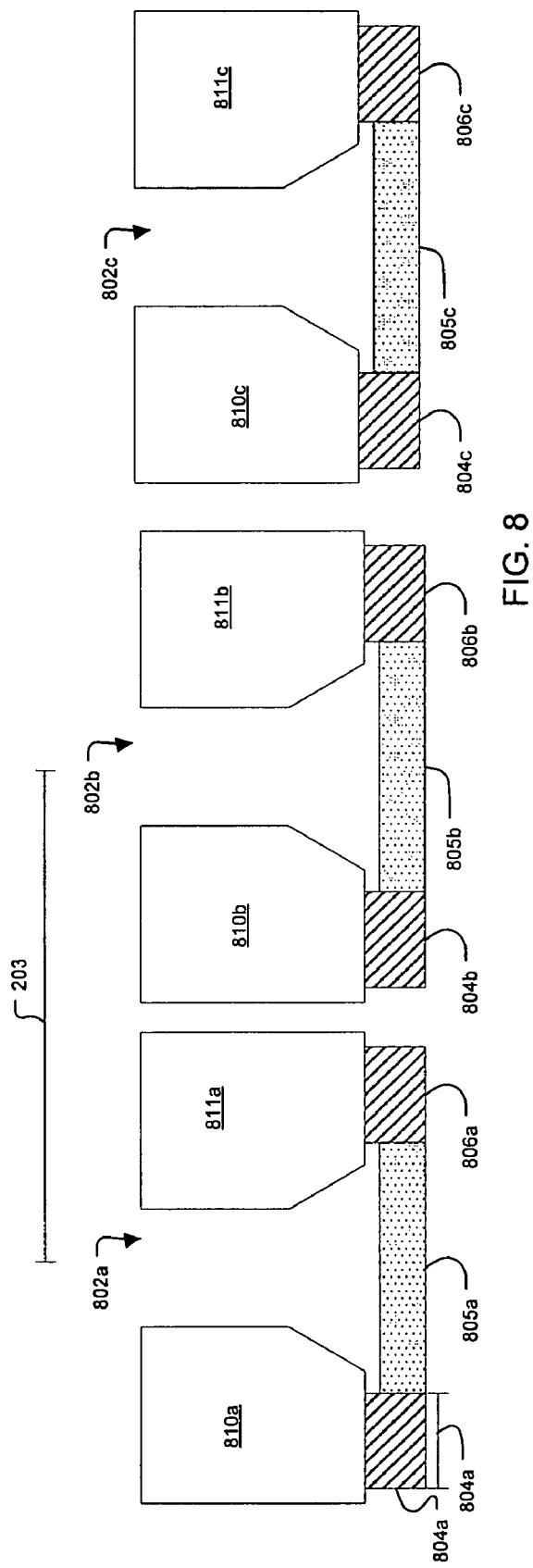
FIG. 8 illustrates a top view of exemplary read elements that may be used in forming active regions of exemplary reader portions of FIGS. 3-5.

FIG. 8 illustrates a top view of read elements 802*a-c* that may be formed in a reader portion according to previous figures. Reader element 802*a* includes permanent magnet 804*a* and permanent magnet 806*a* bracketing active region 805A. Similarly, reader element 802*b* includes permanent magnet 804*b* and permanent magnet 806*b* bracketing active region 805B, and likewise for reader element 802*c*. As discussed with regard to FIGS. 1A-B, permanent magnets 804*a-c* and 806*a-c* serve to bias respective active regions to maintain a proper magnetic orientation. Conductors 8 10*a* and 811*a* are respectively electrically coupled with permanent magnets 804*a* and 806*a*. Conductors 810*a* and 811*a* source current to and sink current from active region 805A. Conductors 810*b* and 811*b* perform that function for active region 805B and likewise for conductors 810*c* and 811*c*. As illustrated and described, such read elements 802*a-c* may typically be CIP readers, with the planes of the active regions 805*a-c* lying parallel with the path of current from permanent magnets 804*a-c* to 806*a-c*.

As described with respect to FIGS. 3 and 4, active regions in each row are relatively disposed for eventual alignment with different data tracks, where each data track is separated from adjacent tracks by a track pitch.

FIG. 3A illustrated a track pitch indication 203 that denoted spacing between active regions 205A and 205B in row 204*a*. FIG. 3A also illustrated 4 rows (rows 204*a-d*) of active regions, which allows active regions in any given row to read every fourth data track. Where data tracks are separated by about 10 microns, active regions in any given row may thus be separated by about 40 microns. By allowing this increased spacing, as compared with a reader that would have multiple active regions spaced apart at 10 micron increments in a single row, active regions in each row are spaced apart for reducing interference with each other. Additionally, active regions in adjacent rows may be shielded from each other by shields (e.g., shields 216*a* and 215B).

In an example where data track pitch is about 10 microns, permanent magnets 804*a-c* and 806*a-c* may be approximately 3 microns in width each (in the dimension of track pitch, and illustrated by example width 825). Also, each of read elements 802*a-c* may be separated by about 1.5 microns. Thus, the permanent magnets and separation between read elements consumes approximately 7.5 microns. Considering that some portion of each active region 805*a-c* may be less sensitive to magnetic fields from the storage medium, an approximate maximum active width of each of active region 805*a-c* may be approximately 1.7 microns with the above assumed dimensions. And so, each reader element 802*a-c* may require about 10 microns of width, including a guard band gap, however, reader elements 802*a-c* may be placed on different rows of reader portions according to previous figures, thereby increasing actual separation of tracks read on any given layer while not coextensively increasing a total width of each reader portion.

Figure 9:
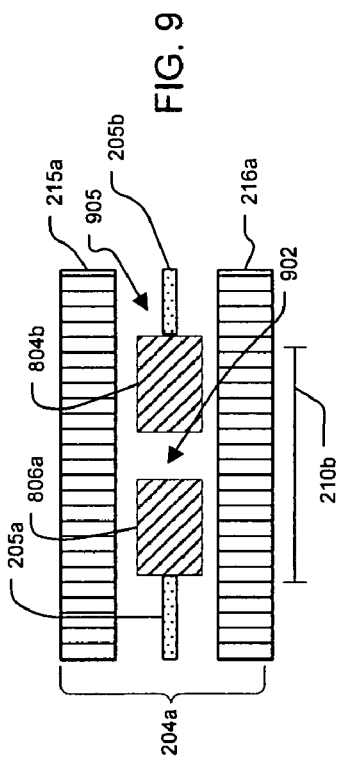
FIG. 9 illustrates a cross-section of an active region of the reader portion of FIG. 3A using read elements of FIG. 8.

FIG. 9 illustrates a portion of a cross-section of row 204*a* of reader portion 200 with read elements constructed like those of FIG. 8. Top shield 215A and bottom shield 216*a* shield active regions 205A and 205B (a portion of each illustrated). Inactive region 210*b* is disposed horizontally between active regions 205A and 205B, and includes permanent magnets 804*b* and 806*a* and gap 902 containing non-conductive material. Gap 902 may for example by about 1.5 microns, as described above. Gap area 905 separates shield regions from permanent magnets/conductors. Conductors 810*a* and 811*a* are not separately illustrated in FIG. 9, but are electrically isolated from each other such that each active region 805A and 805B has a separate lead for sourcing and sinking sensing current.

FIG. 10 illustrates a top view of read elements 1002*a-c* that may be formed in a reader portion according to previous figures. Read elements 1002*a-c* are similar to read elements 802*a-c*. Read elements 1002*a*, 1002*b*, and 1002*c* include respective permanent magnets 1004*a*, 1004*b*, 1004*c*, 1006*a*, 1006*b*, and 1006*c* bracketing active regions 1005A, 1005B, and 1005*c*. One difference between read elements 802*a-c* and read elements 1002*a-c* is that conductors for sense current flowing through active regions are shared between adjacent read elements in a row. For example, conductor 1010*b* is shared between read elements 1002*a* and 1002*b*. Because the read elements 1002*a-c* require fewer conductors for the same number of read elements as read elements 802*a-c*, read elements 1002*a-c* may be made more compact.

A constant current source may be applied across the entire array of read elements 1002*a-c* by applying a current source at 1002*a* and a current sink at 1002*c*. Each read element may be sensed by a high resistance probe measuring voltage drop over each active region by measuring voltage difference between each pair of tapped/shared conductors). However, increased interference between read elements sharing conductors may occur in this example. Other techniques and systems of extracting bit information sensed by active regions 1005*a-c* may be possible. Such techniques and systems may be adjusted for compensating for implementation details, such as physical characteristics of the probes and limitations of the current source.

FIG. 11 illustrates a portion of a cross-section (a face portion) of row 204*a* of reader portion 200 with read elements constructed like those of FIG. 10. Top shield 215A and bottom shield 216*a* shield active regions 205A and 205B (a portion of each illustrated). Inactive region 210*b* is disposed horizontally between active regions 205A and 205B, and includes permanent magnets 1004*a* and 1006*a* and gap 1102. Gap 1102 may for example by about 1.5 microns, as described above. Conductor 1010*b* is illustrated as bridging permanent magnets 1004*a* and 1006*a*.

FIG. 12 illustrates a top view of read elements 1202*a-c* that may be formed in a reader portion according to previous figures. Read elements 1202*a-c* share conductors 1210*a-d*, like read elements 1002*a-c* share conductors 1010*a-d*. One difference between read elements 1002a-c and read elements 1202a-c is read elements 1202a-c share a common permanent magnet dividing adjacent read elements. By example, permanent magnet 1204b separates read elements 1202a and 1202b.

FIG. 13 illustrates a portion of a cross-section of row 204a of reader portion 200 with read elements constructed like those of FIG. 12. Top shield 215A and bottom shield 216a shield active regions 205A and 205B (a portion of each illustrated). Inactive region 210b is disposed horizontally between active regions 205A and 205B, and includes permanent magnet 1204b. As illustrate in FIG. 13, row 204a need not contain gaps as rows illustrated in FIGS. 11 and 9 and may therefore have read elements that can be more densely packed into a row than read elements of FIGS. 9 and 11. However, resistance of the array of read elements may be higher and may therefore have to operate at higher voltages than arrays of read elements illustrated in FIGS. 9 and 11.

Figure 14:
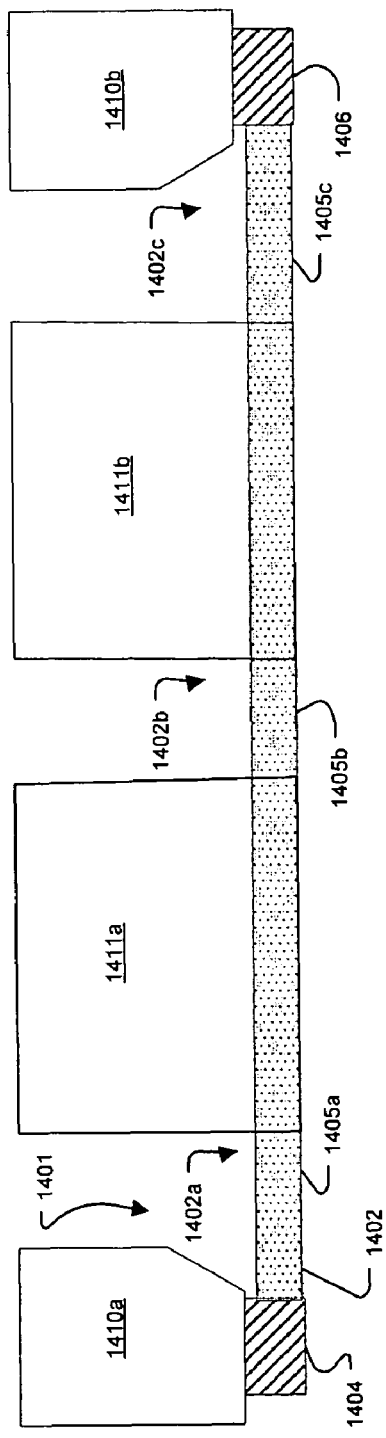
FIG. 14 illustrates a top view of another design for exemplary read elements that may be used in forming active regions of exemplary reader portions of FIGS. 3A-5A.

FIG. 14 illustrates a top view of a plurality 1401 of read elements 1402a-c that may be used in constructing reader portions for closely spaced data tracks on a storage medium. Plurality 1401 includes active regions 1405a-c, which are formed from a continuous MR element 1402 divided by a plurality of conductors (e.g., conductors 1411a and 1411b) spaced along MR element 1402. MR element 1402 is bracketed at its ends by permanent magnets 1404 and 1406. Conductors 1410a and 1410b are respectively electrically coupled with permanent magnets 1404 and 1406 and serve to source and sink current to/from plurality 1401. Conductors 1411a and 1411b serve as sensing points for active regions 1405a-c. In a constant current implementation, sensing voltage drops between pairs of conductors on either side of each active region 1405a-c provides a measure of resistance in each active region 1405a-c which in turn may be interpreted as a signal encoded in a data track being read by each respective active region.

Figure 15:
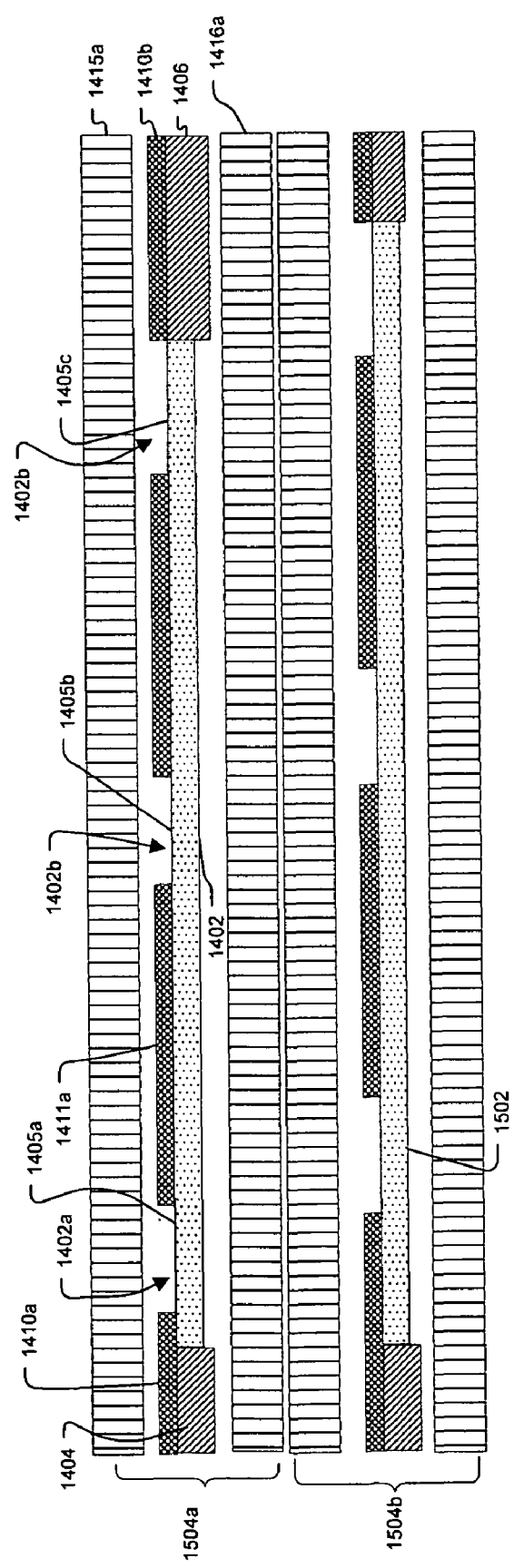
FIG. 15 illustrates a cross-section of an exemplary portion of a reader implementing an active region design according to the read elements of FIG. 14.

FIG. 15 illustrates, in cross-section, rows 1504a and 1504b of a reader portion 1500 having portions constructed in accordance with aspects presented in FIG. 14. To better illustrate a connection between FIGS. 14 and 15, certain elements of FIG. 15 are identified with respect to FIG. 14. FIG. 15 illustrates continuous MR element 1402 of row 1504a and continuous MR element 1502 of row 1504b. Permanent magnets are disposed at each end of each MR element (permanent magnets 1404 and 1406 numbered). Conductors 1410a and 1410b are respectively disposed above permanent magnets 1404 and 1406. Conductors 1411a and 1411b are identified in row 1504a. Active region 1405B is identified in row 1504a disposed between conductors 1411a and 1411b. Like portions of row 1504b correspond to like portions of row 1504a. Inactive regions are generally coincident with the regions where the conductor overlays the MR structure.

FIGS. 3-15 illustrate various portions of readers for forming readers capable of reading closely spaced tracks on a storage medium. Each illustrated portion may include one or more rows of active regions spaced apart at some multiple of data track pitch, and illustrated portions may form arrays of rows of active regions where active regions of different rows are offset with respect to each other such that each active region nominally senses a single data track as the storage medium moves with respect to the reader. Each portion may also comprise various combinations of permanent magnets, shielding, and non-magnetic regions as appropriate for a given design.

Readers according to these illustrated exemplary portions and rows may be formed on ceramic wafers in layers analogously to semiconductor device processing. Some readers according to present aspects, such as those with reader portions in accordance with FIGS. 3A and 8, may comprise separately processed rows of reader portions that may be mechanically coupled together thereafter. Other readers may have integrally formed reader portions, such as those illustrated in FIGS. 4-5. In particular, FIG. 5 illustrates rows 504a-d that may each be formed, and after formation of each layer of each row, the resulting surface may be planarized so that the next layer is uniform on top of the previous layer. As one of ordinary skill in the art would understand, the cross-section illustrated in FIGS. 4-5 illustrate cross-sections that are integrally built up, and then during sectioning of the wafers, these cross-sections are exposed.

In sum, readers may comprise a plurality of active regions constructed. according to aspects and examples described. The active regions may be a really dispersed across a face portion of the reader that is to be disposed for sensing magnetic flux from a storage medium to be read. Each active region may be dispersed so that no active region interferes with another active region, or reads the same data as another active region. In some examples, this dispersal takes the form of a plurality of rows having multiple columns of active regions. Each active region in a row may be separated by about some multiple of track pitch of data tracks on the storage medium. For example, the multiple may be the number of rows. In additional active regions of each row may be column-wise offset from active regions in other rows by at least a nominal width of the active regions. This offset provides that during reading of tracks, each active region reads a separate track. Because active regions according to present aspects are a really dispersed, a present reader for a given number of data tracks may be narrower than a reader with active regions spread across a single row and able to read the same number of data tracks.

Exemplary dimensions that may be used in referencing various examples and aspects described include thicknesses and widths of magnetic shields, thicknesses of non-magnetic material separating active regions, widths of active regions. In some present examples, active regions may have a width in the range of 0.5 to 10.0 microns, and generally the width of such active regions is in the range of half the width of the data tracks on the magnetic medium. In present examples, magnetic shields may range in thickness from 0.4 through 4.0 microns, and may preferably be in the range from 1.0 to 2.0 microns. Exemplary thicknesses of non-magnetic material disposed between magnet shields and having active regions embedded therein may range in thickness from 0.1 to 0.5 microns and may preferably be approximately two to three times as thick as a length of the shortest magnetic domain of a magnetic medium to be read. Where shields may be separated by non-shielding regions, widths of such shields may be selected to shield any biasing magnetic material and/or conductors that may be disposed to bracket a given active region. In some cases, guard bands may separate active regions in different rows. Such guard bands may generally be smaller than half the width of active regions and range between 0.1 microns and 0.5 microns wide. In other examples, active regions between rows may overlap by a distance that is small compared with widths of active regions. Such dimensions are exemplary, but are not limiting and future uses of the invention may employ other dimensions and/or scale factors among dimensions for any and all components described herein.

Figure 16:
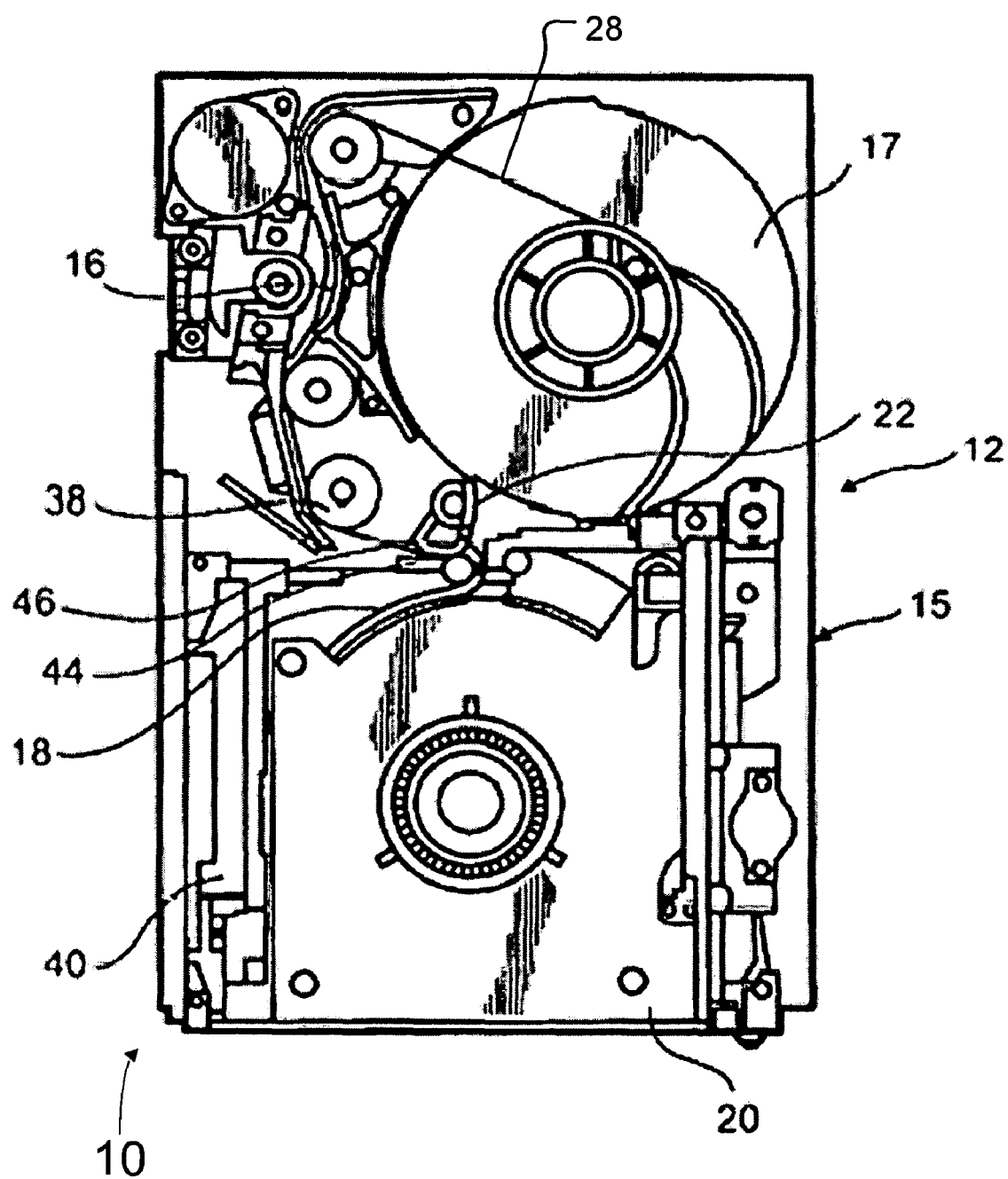
FIG. 16 illustrates a tape drive in which readers formed according to previous figures and related description may be used.

Now referring to FIG. 16, an exemplary tape drive 10 is illustrated in which readers according to various reader portions and rows of reader portions may be used. Tape drive 10 includes a tape drive housing 15, a data transducer 16—a reader according to aspects and/or examples presented herein—, a take-up reel 17, and a receiver 20. Tape drive 10 is typically used in conjunction with a cartridge housing a storage tape 28 spooled on a supply reel. Receiver slot 20 is configured to receive the cartridge. Tape drive 10 may also include a door and various mechanisms for receiving and ejecting that cartridge. When the cartridge is received in receiver slot 20 a buckler motor 46 or the like may engage a cartridge leader and stream tape from the cartridge along a tape path within tape drive 10 passing data transducer 16 and onto take-up reel 17. The tape path may include various tape guides, rollers, and the like before being wound upon take-up reel 17.

Tape drive 10 is typically installed within or associated with a computer and/or a computer network (each not shown). Additionally, tape drive 10 may be used as part of an automated tape library having a plurality of tape cartridges and a robotic transfer mechanism to transport cartridges to one or more tape drives. An exemplary storage library is described in U.S. Pat. No. 5,760,995, entitled "MULTI-DRIVE, MULTI-MAGAZINE MASS STORAGE AND RETRIEVAL UNIT FOR TAPE CARTRIDGES," which is hereby incorporated by reference in its entirety.

This description is exemplary and it will be apparent to those of ordinary skill in the art that numerous modifications and variations are possible.

What is claimed is:

1. A reader for reading from a magnetic storage device, the reader comprising:
   a first row of a plurality of magnetoresistive active regions for sensing magnetic flux indicative of stored data, each active region separated from nearest active regions in the first row by respective inactive regions; and
   a second row of a plurality of active regions, each active region of the second row separated from nearest active regions in the second row by respective inactive regions, wherein each active region in the second row is columnwise offset from active regions in the first row by about a width of the active regions.

2. The reader of claim 1, wherein each inactive region is at least as wide as the active regions.

3. The reader of claim 2, wherein each inactive region is wider than the active regions by a guard band distance.

4. The reader of claim 3, wherein the guard band distance is smaller than half the width of the active region.

5. The reader of claim 2, wherein the guard band distance is between 0.1 microns and 0.5 microns wide.

6. The reader of claim 1, wherein active regions of the first row overlap with corresponding active regions of the second row by a distance that is small compared with the width of the active regions.

7. The reader of claim 1, further comprising:
   a third row of a plurality of active regions, each active region of the third row separated from nearest active regions in the third row by an inactive region approximately at least twice the width of the active region, wherein
      the respective inactive regions separating active regions in the first row and active regions in the second row are each approximately at least twice the width of each active region, and active regions in the first, second and third rows are columnwise offset from each other by approximately the width of the active regions.

8. The reader of claim 1, wherein each active region is coupled with a source of a current and a sink of the current, and the inactive regions respectively include a first and a second permanent magnet for biasing the active regions.

9. The reader of claim 8, wherein the first permanent magnet and the second permanent magnet respectively function as the source of current and the sink of the current.

10. The reader of claim 1, wherein each active region shares a biasing permanent magnet with at least one other active region.

11. The reader of claim 1, wherein respective first and second magnetic shields are formed with each row, the first shield and the second shield disposed to face each other with a non-magnetic material separating the first shield and the second shield and with the active and inactive regions of each respective row embedded in the non-magnetic material.

12. The reader of claim 11, wherein the thickness of the first and second magnetic shields is in the range of 0.4 to 4.0 microns.

13. The reader of claim 11, wherein the thickness of the first and second magnetic shields is between 1.0 micron and 2.0 microns.

14. The reader of claim 11, wherein the thickness of the non-magnetic material separating the first and second magnetic shields is in the range of 0.1 to 0.5 microns.

15. The reader of claim 11, wherein the thickness of the non-magnetic material separating the first and second magnetic shields is in the range of approximately two to three times a length of a shortest magnetic domain on a magnetic medium to be read.

16. The reader of claim 1, wherein the first row and the second row share a magnetic shield.

17. The reader of claim 16, wherein a thickness of the magnetic shield is in the range of 0.4 to 4.0 microns.

18. The reader of claim 16, wherein a thickness of the magnetic shield is in the range of 1.0 to 2.0 microns.

19. The reader of claim 1, wherein the first row and the second row share a magnetic shield that serves as a current conductor for active regions of the first row and the second row.

20. The reader of claim 1, further comprising a layer of magnetic shields interspersed with non-shielding material, each magnetic shield of a width at least as great as the width of the active regions plus widths of biasing magnets bracketing the active region.

21. The reader of claim 20, wherein the width of each magnetic shield is at least as great as the width of the active region plus the widths of the biasing magnets plus widths of conductors for sourcing current to and sinking current from each active region.

22. The reader of claim 1, further comprising a layer of magnetic shields, each magnetic shield for disposition in electrical contact with respective active regions of the first row, each magnetic shield separated from others by non-magnetic regions, and serving as either a current source or a current sink for the respective active regions.

23. The reader of claim 1, wherein each active region comprises one of an AMR sensor, a CIP GMR sensor, a CPP spin valve GMR sensor, and a CPP tunneling GMR sensor.

24. The reader of claim 1, wherein each active region width is about half a width of data tracks recorded on a storage medium.

25. The reader of claim 24, wherein the active region width is in the range of 0.5 to 10.0 microns.

26. The reader of claim 1, wherein active regions of each row are formed from a unitary magnetoresistive element subdivided by a plurality of voltage tabs.

27. In a reader for reading from a magnetic storage medium, a face portion of the reader for opposing a surface of the magnetic storage medium, the face portion comprising:

a plurality of active regions disposed into a plurality of adjacent rows, each row having multiple active, regions, with inactive regions separating active regions in each row, and with column-wise offsets for active regions between adjacent rows; wherein each inactive region has a width at least approximately as great as the width of the active region multiplied by one less than the number of rows of the plurality.

28. The face portion of claim 27, further comprising at least one magnetic shield disposed between adjacent rows.

29. The reader of claim 28, wherein the at least one magnetic shield includes a magnetic shield shared between each adjacent row.

30. The reader of claim 29, wherein each shared magnetic shield serves as a conductor of electrical charge for at least two active regions.

31. The reader of claim 27, wherein the plurality of adjacent rows includes at least four rows, and no active region is column-wise nearest to any active region of an adjacent row, compared with active regions of non-adjacent rows.

32. The reader of claim 27, wherein each row includes a first permanent magnet proximate a first end of the row and a second permanent magnet proximate a second end of the row, and each active region of each row is defined by a plurality of spaced apart voltage tabs in electrical contact with a magnetoresistive element disposed between the first permanent magnet and the second permanent magnet.

33. The reader of claim 27, wherein each active region of each row shares a permanent magnet biasing element with another active region of that row.

34. The reader of claim 27, wherein each active region of each row shares at least one electrical contact with at least one other active region for conducting electrical current for both active regions.

35. A reader for magnetic storage media, comprising:
a plurality of rows of integrally formed magnetoresistive read elements, each read element of a row spaced apart from adjacent read elements of that row by at least a width of the active region multiplied by the number of rows in the plurality, and read elements of all rows of the plurality columnwise offset from each other at least by a width of an active region of the read elements.

36. The reader of claim 35, further comprising a shield for conducting electrical current for at least one of the active regions during operation of the reader.

* * * * *